(12) United States Patent
MacLean et al.

(10) Patent No.: US 11,362,474 B2
(45) Date of Patent: Jun. 14, 2022

(54) GENERATING QUANTUM ELECTRODYNAMIC (QED) INTERACTIONS USING A PARABOLIC TRANSMISSION MIRROR

(71) Applicant: Infinite Potential Laboratories LP, Waterloo (CA)

(72) Inventors: Steve MacLean, Saint Lambert (CA); Stephane Payeur, Montréal (CA); Francois Filion-Gourdeau, Waterloo (CA); Sylvain Fourmaux, Montréal (CA); Joey Dumont, Waterloo (CA)

(73) Assignee: Infinite Potential Laboratories LP, Waterloo (CA)

( * ) Notice: Subject to any disclaimer, the term of this patent is extended or adjusted under 35 U.S.C. 154(b) by 340 days.

(21) Appl. No.: 16/628,971

(22) PCT Filed: Jul. 10, 2018

(86) PCT No.: PCT/CA2018/050837
§ 371 (c)(1),
(2) Date: Jan. 6, 2020

(87) PCT Pub. No.: WO2019/010569
PCT Pub. Date: Jan. 17, 2019

(65) Prior Publication Data
US 2020/0133016 A1    Apr. 30, 2020

Related U.S. Application Data

(60) Provisional application No. 62/530,957, filed on Jul. 11, 2017.

(51) Int. Cl.
*H01S 3/10*    (2006.01)
*H01S 3/00*    (2006.01)
(Continued)

(52) U.S. Cl.
CPC .............. *H01S 3/005* (2013.01); *H01S 3/0007* (2013.01); *H01S 3/1024* (2013.01); *B82Y 20/00* (2013.01);
(Continued)

(58) Field of Classification Search
CPC ........ H01S 3/005; H01S 3/007; H01S 3/0092; H01S 3/1024
See application file for complete search history.

(56) References Cited

U.S. PATENT DOCUMENTS 8,558,199 B2    10/2013    Payeur et al.
9,160,137 B1 *  10/2015    Abdolvand ........... H01S 3/0092
(Continued)

OTHER PUBLICATIONS

EPO, Extended European Search Report dated Apr. 7, 2021, in EP 18831166.6, 6 pgs.
(Continued)

*Primary Examiner* — Kinam Park
(74) *Attorney, Agent, or Firm* — Henry Patent Law Firm PLLC

(57) ABSTRACT

In a general aspect, quantum electrodynamic (QED) interactions are generated using a parabolic transmission mirror. In some aspects, a system for generating a QED interaction includes an optical pulse generator and a vacuum chamber. The vacuum chamber includes a parabolic transmission mirror in an ultra-high vacuum region within the vacuum chamber. The parabolic transmission mirror is configured to produce the QED interaction in the ultra-high vacuum region based on an optical pulse from the optical pulse generator. The parabolic transmission mirror includes an optical inlet at a first end and an optical outlet at a second, opposite end. The parabolic transmission mirror also includes a parabolic reflective surface about an internal volume of the parabolic transmission mirror between the first and second ends. The parabolic reflective surface
(Continued)

extends from the optical inlet to the optical outlet and defines a focal point outside the internal volume of the parabolic transmission mirror.

24 Claims, 6 Drawing Sheets

(51) Int. Cl.
　　*H01S 3/102* (2006.01)
　　*B82Y 20/00* (2011.01)
　　*G02B 5/10* (2006.01)
　　*G02B 27/09* (2006.01)
(52) U.S. Cl.
　　CPC ............ *G02B 5/10* (2013.01); *G02B 27/0983* (2013.01); *H01S 3/0092* (2013.01)

(56) References Cited

U.S. PATENT DOCUMENTS

| | | | | |
|---|---|---|---|---|
| 2013/0161539 | A1* | 6/2013 | Payeur | H01J 35/02 250/493.1 |
| 2015/0015890 | A1* | 1/2015 | Zheng | G01J 3/10 356/450 |
| 2020/0209709 | A1* | 7/2020 | Suchowski | G02F 1/355 |

OTHER PUBLICATIONS

Fillion-Gourdeau, et al., "Scheme for the detection of mixing processes in vacuum", arXiv:1407.3014v2 [hep-ph], Apr. 2, 2015, 6 pgs.

WIPO, International Search Report and Written Opinion of the ISA dated Aug. 16, 2018, in PCT/CA2018/050837, 6 pgs.

Alber, et al., "QED with a parabolic mirror", arXiv:1305.2488v3, Aug. 15, 2013, 12 pgs.

Battesti, R., et al., "Magnetic and electric properties of a quantum vacuum", Rep. Prog. Phys. 76 (2013) 016401, Dec. 14, 2012, 23 pages.

Dumont, J., et al., "Efficiently parallelized modeling of tightly focused, large bandwidth laser pulses", J. Opt. 19 (2017) 025604, Jan. 6, 2017, 13 pages.

Fillion-Gordeau, F., et al., "Scheme for the detection of mixing processes in vacuum", arXiv:1407.3014v2 [hep-ph] Apr. 2, 2015, Apr. 2, 2015, 6 pages.

Moulin, F., et al., "Four-wave interaction in gas and vacuum: definition of a third-order nonlinear effective susceptibility in vacuum", Optics Communications 164, 999. 137-144, Jun. 1, 1999, 8 pages.

Thum-Jager, A., et al., "Angular emission distributions of neutrals and ions in laser ablated particle beams", J. Phys. D: Appl. Phys. 32 (1999) 2827-2831, 1999, 6 pages.

* cited by examiner

GENERATING QUANTUM ELECTRODYNAMIC (QED) INTERACTIONS USING A PARABOLIC TRANSMISSION MIRROR

CROSS-REFERENCE TO RELATED APPLICATION

This application is a national stage entry of PCT/CA2018/050837, filed Jul. 10, 2018, and entitled "Generating Quantum Electrodynamic (QED) Interactions Using a Parabolic Transmission Mirror," which claims priority to U.S. Provisional Application No. 62/530,957, filed Jul. 11, 2017, and entitled "Generating Quantum Electrodynamic (QED) Interactions Using a Parabolic Transmission Mirror," the contents of which are hereby incorporated by reference.

BACKGROUND

The following description relates to generating quantum electrodynamic (QED) interactions using a parabolic transmission mirror.

Some types of QED interactions may be produced by high intensity ultrashort laser pulses that are tightly focused to create high intensity electromagnetic fields. For example, it has been proposed that high-power laser infrastructures may be used to study four-wave nonlinear optical mixing, vacuum polarization, Breit-Wheeler pair production, nonlinear Compton scattering and Schwinger pair production.

DESCRIPTION OF DRAWINGS

FIG. 4A shows a perspective view; FIG. 4B shows an end view; FIG. 4C shows a cross section view.

DETAILED DESCRIPTION

In aspects of what is described here, quantum electrodynamic (QED) interactions may be generated using a parabolic transmission mirror. In the examples shown, the parabolic transmission mirror has an optical inlet and an optical outlet with a parabolic reflective surface between the inlet and the outlet. In some examples, the parabolic transmission mirror has a parabolic reflective surface that defines a focal point in a position that is outside an inner volume of the parabolic transmission mirror and beyond the optical outlet. In some implementations, a system may generate an ultrashort optical pulse that is transmitted toward the parabolic transmission mirror (e.g., by a deformable mirror), where it is focused by the parabolic reflective surface toward the focal point, which is located beyond the optical outlet of the parabolic transmission mirror. The parabolic transmission mirror may thus focus the beam carrying the pulse without retro-reflecting the beam, as would a parabolic reflecting mirror whose focal point is defined within its inner volume. The parabolic transmission mirror can allow access to the focal point without interfering with the input beam, such as, for example, allowing a static field to be wrapped around the focal point without interfering with the input beam.

Using a parabolic transmission mirror to generate QED interactions may provide one or more advantages, in some implementations. For example, QED interactions (e.g., a number of photons generated by the interactions) may be enhanced by using a parabolic transmission mirror (e.g., as compared to using a parabolic reflection mirror). The parabolic transmission mirror may also allow for greater fluence than a parabolic reflection mirror. In addition, a parabolic transmission mirror may allow direct access to the QED interaction region without perturbing the incident beam on the parabolic transmission mirror. For instance, in some aspects, probes, grids, collectors, cavities, intersecting photons and target matter (e.g., particle beams, plasmas, electrons, atoms, ions and nuclei) may be placed or otherwise introduced in the proximity of the QED interaction region (e.g., within a few microns of the focal point of the mirror) to provide enhancement and metrology of the QED interaction taking place. Furthermore, the use of a parabolic transmission mirror can greatly reduce the amount of debris striking the surface of the parabolic transmission mirror compared to other types of focusing geometry such as, for example, off-axis parabolic mirrors or on-axis high numerical aperture parabolic mirrors, since debris may be ejected from the laser-target interaction zone (e.g., near the focal point of the mirror) typically in a cosine-squared distribution normal to the target. In some instances, a cascaded arrangement of parabolic transmission mirrors may be used, for example, to increase the number of high intensity regions for QED interactions with a single laser pulse.

Figure 1:
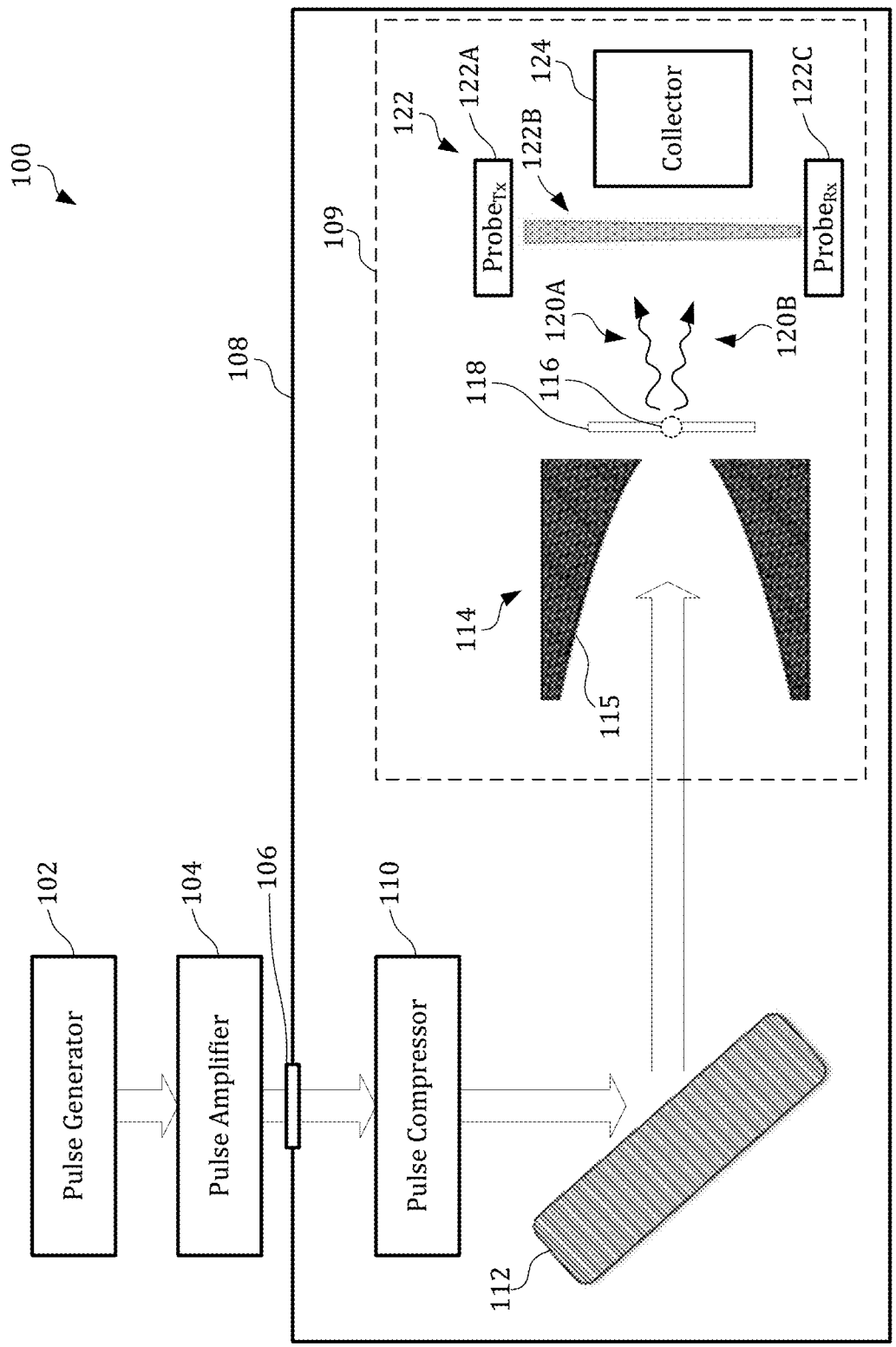
FIG. 1 is a diagram showing an example system for generating quantum electrodynamic (QED) interactions.

FIG. 1 is a diagram showing an example system 100 for generating quantum electrodynamic (QED) interactions. In some implementations, the system 100 may be used to generate QED interactions, such as, for example, a four-wave nonlinear optical mixing (FWM) process (e.g., a two photon in/two photon out), positronium generation, optical field induced birefringence, optical field induced photo splitting, associated inverse processes, or other types of QED interactions (e.g., Kerr Effect, Cotton-Mouton effect, or Jones birefringence processes). The example system 100 shown in FIG. 1 includes a pulse generator 102, a pulse amplifier 104, a pulse compressor 110, a mirror 112, a parabolic transmission mirror 114, and a thin film 118. The system 100 also includes a probe 122 for detecting or analyzing the QED interactions, and a collector 124 for collecting matter or anti-matter generated by the QED interactions. In the example shown, the pulse compressor 110, mirror 112, parabolic transmission mirror 114, thin film 118, and the probe 122 each reside in the vacuum chamber 108. The pulse generator 102 and the pulse amplifier 104 reside outside the vacuum chamber 108, and an optical inlet 106 allows optical pulses to be transmitted from the pulse amplifier 104 to the pulse compressor 110 inside the vacuum chamber 108.

In some implementations, the system 100 maintains one or more ultra-high vacuum regions within the vacuum chamber 108. The ultra-high vacuum regions are maintained at an ultra-high vacuum pressure (e.g., less than $10^{-8}$, or less than $10^{-10}$ Torr), which reduces noise in the system 100, and allows for increased laser pulse intensity for generation of QED interactions (e.g., generation of more photons). In the example shown, the parabolic transmission mirror 114 and the thin film 118 reside within an ultra-high vacuum region 109 of the vacuum chamber 108. The probe 122 also resides at least partially within the ultra-high vacuum region 109. In some implementations, other components of the system 100 (e.g., the mirror 112) reside within the ultra-high vacuum region 109 of the vacuum chamber 108.

The example pulse generator 102 is a system of one or more components that generates an optical pulse and directs the pulse toward the pulse amplifier 104. In some implementations, the optical pulse generated by the pulse generator 102 is a Fourier transform limited (or transform-limited) optical pulse. In some implementations, the pulse generator 102 includes a femtosecond laser oscillator, such as, for example, a femtosecond Ti:sapphire laser. The pulse generator 102 may include additional or different components. For example, in some implementations, the pulse generator 102 includes a chirped pulse amplification (CPA) system in addition to a femtosecond laser oscillator. In some implementations, the pulse generator 102 is configured to generate optical pulses having a duration of approximately 25 femtoseconds (fs) and spectrum of approximately 750-850 nanometers (nm), a duration of approximately 15 femtoseconds (fs) and spectrum of approximately 730-870 nanometers (nm), or a duration of approximately 10 femtoseconds (fs) and spectrum of approximately 650-950 nanometers (nm). The pulse generator 102 may be configured to generate optical pulses at a particular repetition rate, such as, for example, between 1-10 Hertz (Hz). In some implementations, for example, the pulse generator 102 generates optical pulses at a rate of 2.5 Hertz (Hz).

The example pulse amplifier 104 is a system of one or more components that receives the optical pulse from the pulse generator 102 and increases the energy (e.g., peak power) of the optical pulse. In some implementations, the pulse amplifier 104 increases the energy of the optical pulse using one or more optical elements having a gain medium that transfers energy input to the gain medium (e.g., electrical energy) to the optical pulse. For example, in some instances, the pulse amplifier 104 includes a multipass amplifier having a Ti:sapphire gain medium or another type of gain medium.

In some instances, the pulse amplifier 104 includes a pulse stretcher that stretches the optical pulse produced by the pulse generator 102 before amplification. The pulse stretcher may stretch the optical pulse using one or more dispersive optical elements, such as diffraction gratings, optical glass with chromatic dispersion characteristics (e.g., SCHOTT SF57 glass), or dispersive mirrors. The dispersive optical elements of the pulse stretcher may cause the different wavelength components of the optical pulse to disperse spatially and temporally from one another while travelling through the pulse stretcher, causing the stretched optical pulse to have a lower intensity (e.g., an intensity below the damage threshold of the gain elements in the pulse amplifier 104). The dispersive optical elements of the pulse stretcher may positively or negatively disperse the optical pulse.

The example pulse compressor 110 is a system of one or more components that receives the amplified optical pulse from the pulse amplifier 104, and compresses the amplified optical pulse using optical dispersion. In some implementations, the pulse compressor 110 includes one or more optical elements defining an optical path through the pulse compressor 110, with the optical elements arranged to disperse the optical pulse in the optical path. The pulse compressor 110 may include one or more dispersive optical elements, such as, for example, diffraction gratings or dispersive mirrors.

In some implementations, the pulse compressor 110 includes one or more of the components described with respect to the chirped pulse amplifier system 200 in the International (PCT) Publication No. WO 2017/100930, entitled "Pulse Compression in Chirped Pulse Laser Systems." For example, in some instances, the pulse compressor 110 includes diffraction gratings and a highly dispersive mirror (HDM) that has a smooth reflective surface and is composed of layers of dielectric materials. In some implementations, the HDM includes alternating layers of high- and low-index dielectric materials, such as Titanium dioxide ($TiO_2$) and Silicon dioxide ($SiO_2$), respectively. In some implementations, the total physical thickness of the high-index material is approximately 4700 nm, while the total physical thickness of the low-index material is approximately 7700 m. Other materials and layer thickness can be used. Furthermore, in some implementations, system 100 may also include an acousto-optic programmable dispersive filter (AOPDF) that modifies the spectral phase of the optical pulse. The AOPDF may be located between the pulse generator 102 and pulse amplifier 104, or in another location.

In some implementations incorporating a pulse stretcher (e.g., inside the pulse amplifier 104), the dispersive optical elements of the pulse compressor 110 may cause an opposite magnitude dispersion of the optical pulse than the dispersive optical elements of the pulse stretcher. For example, where a pulse stretcher positively disperses the optical pulse, the pulse compressor 110 negatively disperses the optical pulse. Furthermore, in some implementations, the pulse compressor 110 is configured to at least approximately cancel out the amount of dispersion imparted to the optical pulse by the pulse stretcher.

The example mirror 112 receives the compressed optical pulse from the pulse compressor 110 and directs (by reflection) the optical pulse toward the parabolic transmission mirror 114. The mirror 112 accordingly defines at least a portion of an optical path of the compressed optical pulse between the pulse compressor 110 and the parabolic transmission mirror 114. In the example shown, the parabolic transmission mirror 114 is arranged on-axis with an incident beam carrying the optical pulse. In some implementations, the mirror 112 is a deformable mirror. For example, the mirror 112 may include a reflective surface that can be controllably deformed to modify or compensate one or more aspects of the compressed optical pulse. For instance, the deformable mirror may modify one or more wave front properties of an incident beam, or another characteristic of the beam. In some implementations, the mirror 112 includes actuators (e.g., piezo-electric or mechanical actuators) that cause the reflective surface of the mirror 112 to deform as pressure is applied to the reflective surface by the actuators.

The example parabolic transmission mirror 114 receives the reflected optical pulse from the mirror 112 at an optical inlet at a first end (the left end of the parabolic transmission mirror 114 as shown in FIG. 1) and focuses the optical pulse toward a focal point 116 using a reflective surface 115 about an internal volume of the parabolic transmission mirror 114. The reflective surface 115 may define the focal point 116 at or near an optical outlet of the parabolic transmission mirror 114 at a second end (the right end of the parabolic transmission mirror 114 as shown in FIG. 1) that is opposite the first end. For example, the reflective surface 115 shown in FIG. 1 defines a focal point 116 beyond (to the right of, in the diagram) the outlet of the parabolic transmission mirror 114. In this type of arrangement, the parabolic transmission mirror 114 can transmit the focused optical pulse away from the mirror 112, rather than reflect it back toward the mirror 112.

In some implementations, the reflective surface 115 defines the focal point 116 beyond the second end of the parabolic transmission mirror 114. The location of the focal point 116 may depend on the dimensions of the parabolic transmission mirror 114. In some implementations, the focal point 116 is defined at a distance beyond the second end of the parabolic transmission mirror 114 that is less than the focal length of the parabolic transmission mirror 114 (the distance of the focal point from the second end that is less than the focal length of the parabolic transmission mirror). For example, a parabolic transmission mirror 114 having an optical inlet with a diameter of approximately 150-200 millimeters (mm) and a focal length of approximately 10 millimeters (mm) may define a focal point 116 that is at a location between zero (0) and five (5) millimeters (mm) beyond the second end of the parabolic transmission mirror 114. In some implementations, the reflective surface 115 defines the focal point 116 at the second end of the parabolic transmission mirror 114 (at a distance of zero (0) millimeters (mm) beyond the second end of the parabolic transmission mirror 114).

Figure 4A:
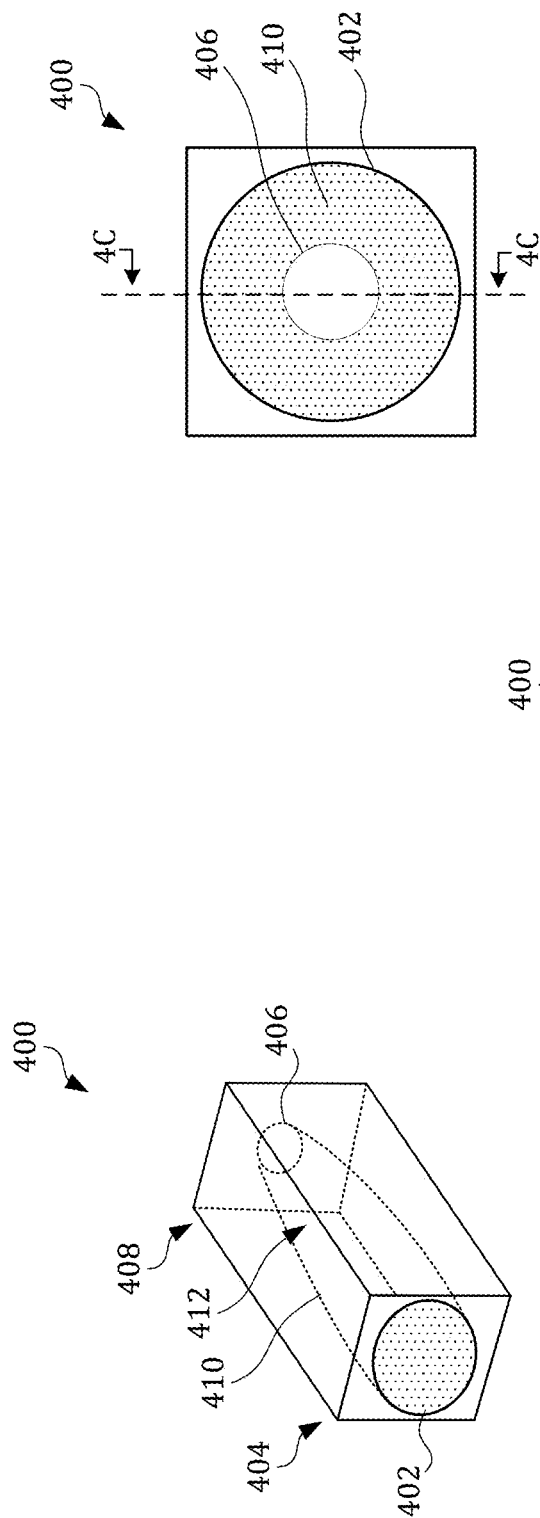
FIGS. 4A-4C are diagrams showing an example parabolic transmission mirror.
Figure 4B:
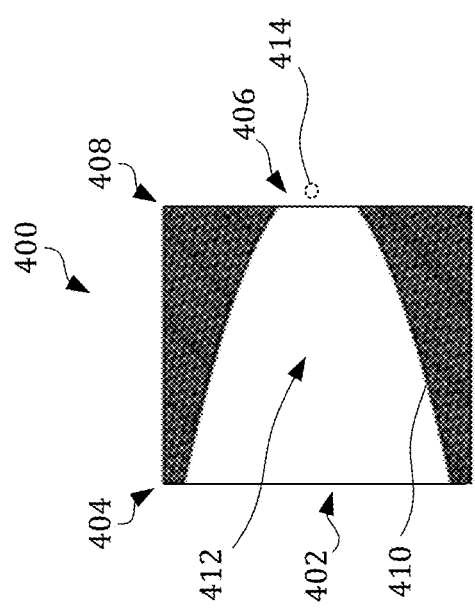
Figure 4C:
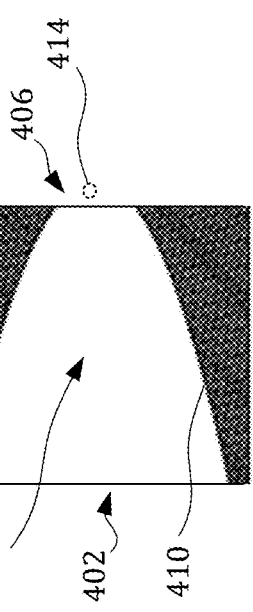

In some implementations, the reflective surface 115 forms a paraboloid-shaped surface. In some implementations, the reflective surface 115 extends from the inlet of the parabolic transmission mirror 114 to the outlet on the opposite end of the parabolic transmission mirror 114. In some implementations, the parabolic transmission mirror 114 is formed as shown in FIGS. 4A-4C and described below. For example, the optical inlet and the optical outlet can be circular openings in the parabolic transmission mirror 114, with the optical inlet having a diameter greater than the diameter of the optical outlet. In some implementations, a ratio of the surface area of the reflective surface 115 to the area of the optical inlet is greater than 2.5 (e.g., 2.8 for a parabolic reflective mirror having a focal length of 10 millimeters (mm) and an optical inlet having a diameter of 160 millimeters (mm)). A ratio greater than 2.5 may allow the parabolic transmission mirror 114 to have a higher threshold of incident energy in the optical pulse before the damage threshold of the mirror 114 is reached. For example, in some instances, the incident energy of the optical pulse may be increased by a factor of approximately √2 before the damage threshold of the parabolic transmission mirror 114 is reached. Parabolic transmission mirrors with shorter focal lengths may have increased ratios. The parabolic transmission mirror 114 may be formed in another manner.

Figure 3A:
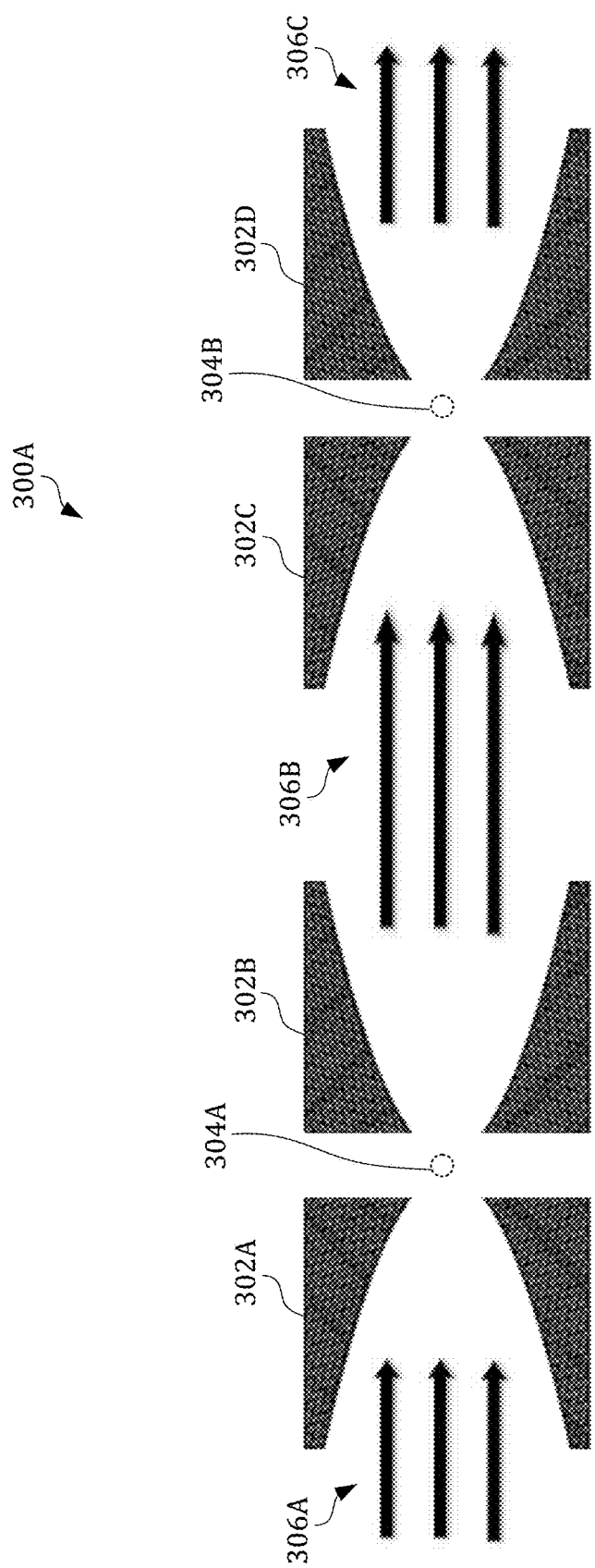
FIGS. 3A-3B are diagrams showing example systems of cascaded parabolic transmission mirrors.
Figure 3B:
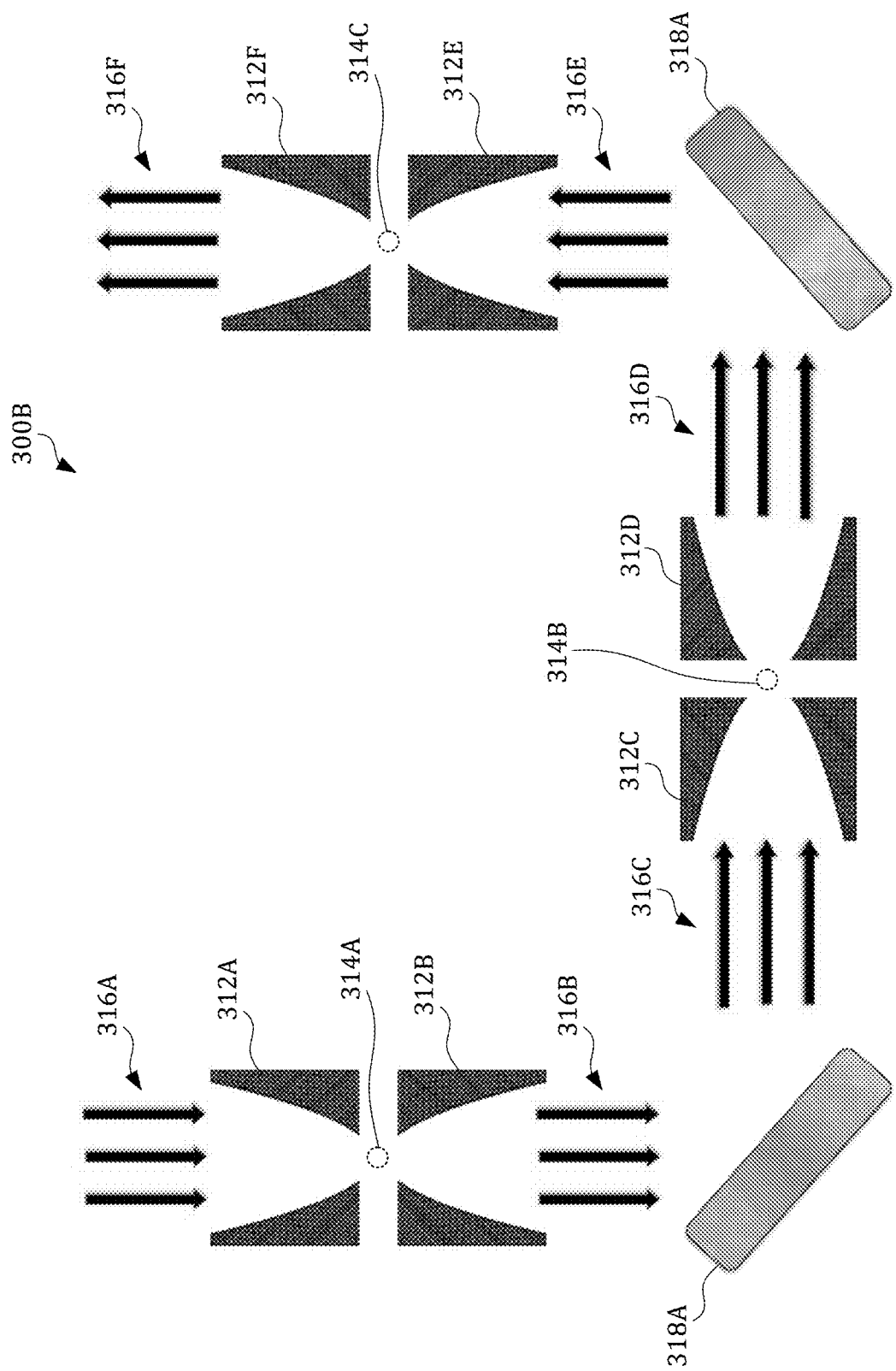

In some implementations, additional parabolic transmission mirrors may be used in the system 100. For example, a cascaded arrangement of parabolic transmission mirrors similar to the system 300 of FIG. 3 may allow for an increased number of high intensity regions within the vacuum chamber 108 (e.g., regions at or near the focal points of the parabolic transmission mirrors). As another example, a cascaded arrangement of parabolic transmission mirrors similar to the system 300 of FIG. 3 may be placed between the mirror 112 and the parabolic transmission mirror 114 to maintain beam shape as the optical pulse travels from the mirror 112 to the parabolic transmission mirror 114. The cascaded arrangement of parabolic transmission mirrors may be used in a row geometry (e.g., as shown in FIG. 3A), a ring geometry (e.g., as shown in FIG. 3B), or in another geometry.

The example thin film 118 is a layer of material having a thickness on the order of nanometers (nm) or micrometers (μm). In some implementations, for example, the thin film 118 is a metallic (e.g., Gold) film having a sub-micron thickness. All or part of the thin film 118 may be placed in a high intensity region within the system 100. For instance, in the example shown, the thin film 118 intersects (e.g., extends through or near) the focal point 116 of the parabolic transmission mirror 114. By positioning the thin film 118 in a high intensity region, the thin film 118 may enhance the generation of certain QED interactions in the system 100. For example, a high intensity optical pulse focused toward the focal point 116 may interact with the thin film 118 at the focal point 116 and generate particles 120A and 120B as shown in FIG. 1. In some implementations, a high intensity optical pulse focused toward the focal point 116 may interact with the thin film 118 at the focal point 116 and produce Compton scattering effects or their inverse. For example, electrons generated from the interaction of the high intensity optical pulse and the thin film 118 may generate photons therefrom.

The example probe 122 is situated beyond the second end of the parabolic transmission mirror 114 (the right side as shown in FIG. 1). In the example shown, the probe 122 resides within the ultra-high vacuum region 109 of the vacuum chamber 108. The probe 122 includes a beam transmitter 122A configured to generate a probe beam 122B and a beam receiver 122C configured to receive the beam 122B transmitted by the beam transmitter 122A. The probe 122 may include other components (e.g., a memory, processor, or other computer system components) that collect, analyze, or otherwise process signals produced by the probe 122. The example collector 124 is likewise situated beyond the second end of the parabolic transmission mirror 114 (the right side as shown in FIG. 1), and in the example shown, resides within the ultra-high vacuum region 109 of the vacuum chamber 108. The collector 124 includes one or more components that are configured to collect matter or anti-matter generated by the QED interactions.

In the example shown in FIG. 1, the probe 122 and collector 124 are each positioned near a high intensity region such that they can analyze aspects of the QED interactions that occur in the high intensity region. In the example shown in FIG. 1, for instance, the probe 122 can detect aspects of the QED interactions without perturbing the incident beam on the parabolic transmission mirror 114. For example, the probe 122 may be positioned near the focal point 116 or another high intensity region or expected area of QED interaction outside the interior volume of the parabolic transmission mirror 114. In some implementations, the probe 122 is implemented as an electromagnetic beam (e.g., a beam of photons) or a high-Z particle beam. In some implementations, the probe 122 can detect charge, energy, radiation, spin, or other characteristics of the QED interaction or products thereof (e.g., photons or particles). Likewise, the collector 124 can collect products of the QED interactions without perturbing the incident beam on the parabolic transmission mirror 114.

Figure 2:
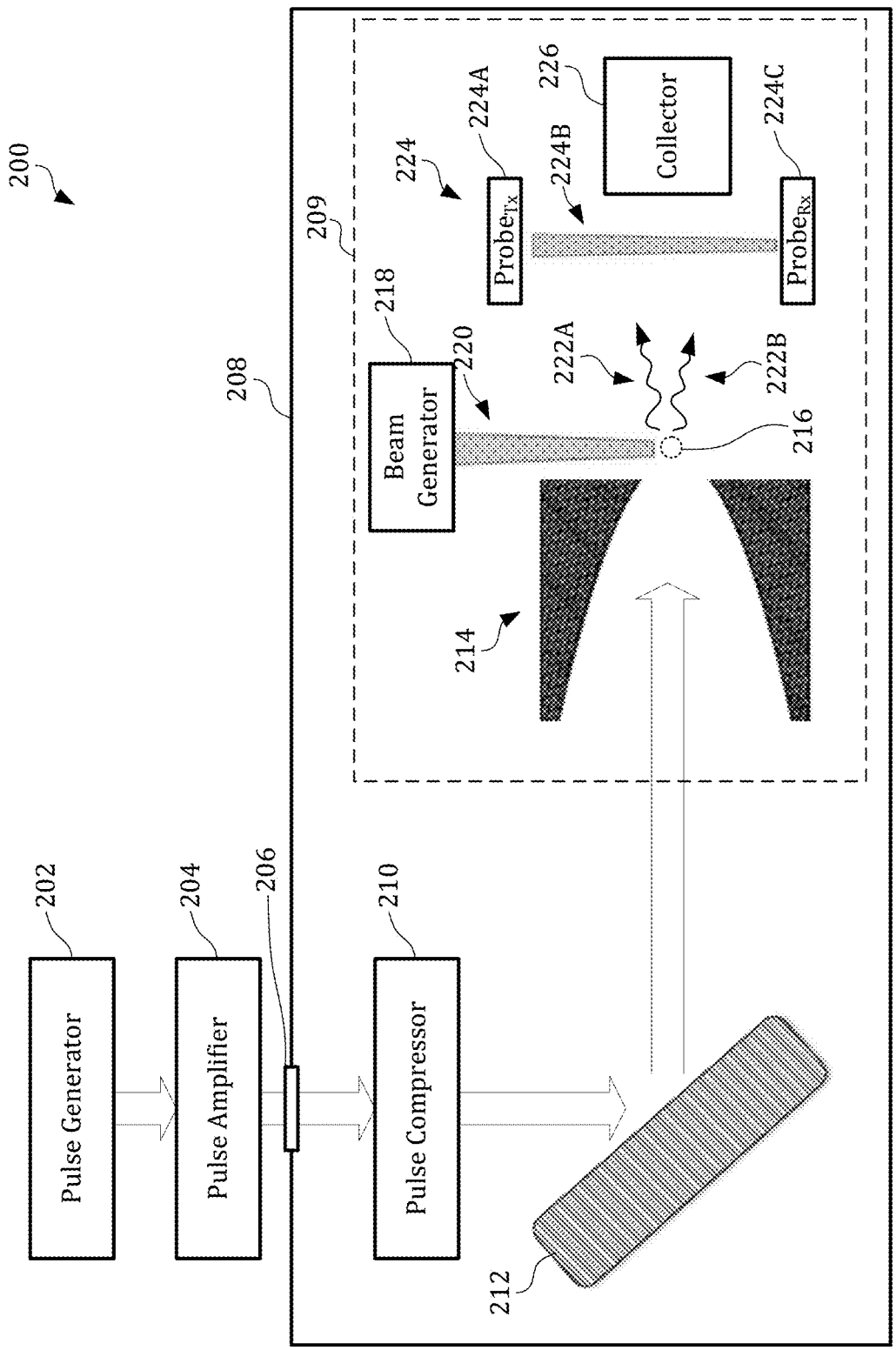
FIG. 2 is a diagram showing another example system for generating quantum electrodynamic (QED) interactions.

FIG. 2 is a diagram showing another example system 200 for generating quantum electrodynamic (QED) interactions. The example system 200 is similar to the example system 100 described above with respect to FIG. 1, but includes a beam generator 218 rather than a thin film as in FIG. 1. The example beam generator 218 generates a beam 220 of particles or photons, and directs the beam 220 toward a high intensity region within the system 200. For instance, in the example shown, the beam generator 218 directs the beam 220 toward the focal point 216. A particle beam may include neutrons, electrons, ions, or another type of particles, and a photon beam may include X-rays (soft or hard) or energetic gamma rays. By directing the beam 220 toward a high intensity region, the particles of the beam 220 may enhance the generation of certain QED interactions by the system 200. For example, a high intensity optical pulse focused toward the focal point 216 may interact with the particles of the beam 220 at or near the focal point 216 and generate particles 222A and 222B as shown in FIG. 2. In some implementations, a high intensity optical pulse focused toward the focal point 216 may interact with the particles of the beam 220 at or near the focal point 216 and produce Compton scattering processes, trident processes, or Breit-Wheeler processes.

In some implementations, a system for generating QED interactions may include some or all of the components shown in FIGS. 1 and 2, but without a thin film in or a particle beam directed toward the high intensity region within the ultra-high vacuum region. Such a system may generate QED interactions without the aid of a thin film or particle beam. For example, in some implementations, Schwinger pair production processes may be produced by a system similar to system 100 of FIG. 1, but without the thin film 118.

To generate efficient QED interactions in a vacuum chamber such as vacuum chambers 108 and 208 of FIGS. 1 and 2, respectively, the system may generate a high field intensity by focusing the optical pulse toward the focal point of the parabolic transmission mirror. In addition, the system may optimize (e.g., maximize) the Lorentz invariants $$F \propto ((E^2 - c^2 B^2)$$

$$G \propto (E \cdot B)$$

for the QED interaction. In some instances, incident beam modes (e.g., the use of TEM00, TM01, or TE01 modes), wave fronts (e.g., different spatial and radial profile field distributions), or other control parameters can be used to optimize the Lorentz invariant factors or the field intensity at the focal point.

The systems 100 and 200 of FIGS. 1 and 2, respectively, may optimize the fields that are directly associated with specific QED interactions (e.g., vacuum FWM, Schwinger pair production, or other QED interactions). Table 1 below includes data obtained from simulations of QED interactions generated by a system that generates four wave mixing (2-in/2-out) QED processes, along with data obtained from simulations of QED interactions generated by a system utilizing an off-axis reflective parabolic mirror having a numerical aperture of 0.7, and a system utilizing an on-axis reflective parabolic mirror having a numerical aperture of 1. The data of Table 1 assumes a fixed fluence laser source; however, the use of a parabolic transmission mirror may allow for greater fluence (e.g., by at least √2) than the off-axis reflective parabolic mirror having a numerical aperture of 0.7 and the on-axis reflective parabolic mirror having a numerical aperture of 1. As shown by the data in Table 1, the use of a parabolic transmission mirror may allow for enhanced QED interaction generation, such as, for example, the generation of photons via a FWM process. Furthermore, as shown by the data in Table 1, the use of a parabolic transmission mirror may allow for enhanced QED interaction generation with a lower intensity optical pulse than the system utilizing parabolic reflective mirrors. For instance, compared to other types of focusing optics, the parabolic transmission mirror may provide an enhancement by producing approximately the same number of photons, or a higher number of photons in some cases, from a lower intensity optical pulse.

TABLE 1

| Type of Focusing Optics | Intensity ($10^{23}$ W/cm$^2$) | Total Generated Vacuum FWM photons |
|---|---|---|
| Off-Axis Parabolic Reflective Mirror with NA = 0.7 | 2.37 | 1.22e−2 |
| On-Axis Parabolic Reflective Mirror with NA = 1 | 3.87 | 0.566 |
| Parabolic Transmission Mirror (0.015 m focal length) | 0.88 | 0.601 |

FIGS. 3A-3B are diagrams showing example systems 300 of cascaded parabolic transmission mirrors. In the example shown in FIG. 3A, the cascaded arrangement of parabolic transmission mirrors 302 in a row geometry, and includes pairs of parabolic transmission mirrors 302 that have their focal points 304 align and coincide with one another. For instance, the parabolic transmission mirror 302A and parabolic transmission mirror 302B are positioned such that their focal points coincide at focal point 304A. Likewise, the parabolic transmission mirror 302C and parabolic transmission mirror 302D are positioned such that their focal points coincide at focal point 304B.

In the example arrangement shown in FIG. 3A, the collimated beam 306A incident upon the parabolic transmission mirror 302A converges toward the aligned focal point 304A and is then re-collimated into collimated beam 306B by the parabolic transmission mirror 302B as it continues past (and diverges from) the aligned focal point 304A. Similarly, the collimated beam 306B incident upon the parabolic transmission mirror 302C converges toward the aligned focal point 304B and is then re-collimated into collimated beam 306C by the parabolic transmission mirror 302D as it continues past (and diverges from) the aligned focal point 304B. By positioning the parabolic transmission mirrors 302 in this cascaded arrangement, the number of high intensity regions (e.g., the regions at or near the aligned focal points 304) is increased for a single laser pulse, which may allow for additional QED interactions to occur within a system.

In the example shown in FIG. 3B, the cascaded arrangement of parabolic transmission mirrors 312 in a ring geometry, and includes pairs of parabolic transmission mirrors 312 that have their focal points 314 align and coincide with one another, and deformable mirrors 318 oriented at 45 degrees between the respective pairs of parabolic transmission mirrors 312. The deformable mirrors 318 define at least a portion of an optical path through the system 300B. The parabolic transmission mirror 312A and parabolic transmission mirror 312B are positioned such that their focal points coincide at focal point 314A. Likewise, the parabolic transmission mirror 312C and parabolic transmission mirror 312D are positioned such that their focal points coincide at focal point 314B, and the parabolic transmission mirror 312E and parabolic transmission mirror 312F are positioned such that their focal points coincide at focal point 314C.

In the example arrangement shown in FIG. 3B, the collimated beam 316A incident upon the parabolic transmission mirror 312A converges toward the aligned focal point 314A and is then re-collimated into collimated beam 316B by the parabolic transmission mirror 312B as it continues past (and diverges from) the aligned focal point 314A. The collimated beam 316B is then incident upon a deformable mirror 318A, which reflects the collimated beam 316B as collimated beam 316C toward the parabolic transmission mirror 312C. The deformable mirror 318A may include a reflective surface that can be controllably deformed to modify or compensate one or more aspects of the beam as it is reflected. For instance, the deformable mirror 318a may modify one or more wave front properties of the beam 316B, or another characteristic of the beam 316B. In some implementations, the deformable mirror 318A includes actuators (e.g., piezo-electric or mechanical actuators) that cause the reflective surface of the deformable mirror 318A to deform as pressure is applied to the reflective surface by the actuators.

The collimated beam 316C is directed toward the parabolic transmission mirror 312C, where it converges toward the aligned focal point 314B and is then re-collimated into collimated beam 316D by the parabolic transmission mirror 312D as it continues past (and diverges from) the aligned focal point 314B. The collimated beam 316D is then incident upon a deformable mirror 318B. The deformable mirror 318B may be implemented similar to the deformable mirror 318A or different from the deformable mirror 318A, and may modify one or more wave front properties of the beam 316D. The deformable mirror 318B reflects the collimated beam 316D as collimated beam 316E and directs the collimated beam 316E toward the parabolic transmission mirror 312E, where the collimated beam 316E converges toward the aligned focal point 314C. The beam is then re-collimated into collimated beam 316F by the parabolic transmission mirror 312F as it continues past (and diverges from) the aligned focal point 314C.

By positioning the parabolic transmission mirrors 312 in this cascaded arrangement, the number of high intensity regions (e.g., the regions at or near the aligned focal points 314) is increased for a single laser pulse, which may allow for additional QED interactions to occur within a system. In addition, certain characteristics (e.g., wave front properties) of the beams within the system may be modified using one or more of the deformable mirrors 318.

FIGS. 4A-4C are diagrams showing different views of an example parabolic transmission mirror 400. FIG. 4A shows a perspective view; FIG. 4B shows an end view; FIG. 4C shows a cross section view. The example parabolic transmission mirror 400 may be used in a system to generate QED interactions. For example, the parabolic transmission mirror 400 may be used in systems 100 and 200 of FIGS. 1 and 2, respectively, as parabolic transmission mirrors 114 and 214. Furthermore, the parabolic transmission mirror 400 may be used in a cascaded system of parabolic transmission mirrors. For example, multiple parabolic transmission mirrors 400 may be arranged similar to the system 300 of FIG. 3 within a system to provide multiple high intensity regions within a QED interaction system (e.g., systems 100 and 200 of FIGS. 1 and 2, respectively) for a single optical pulse.

In the example shown, the parabolic transmission mirror 400 has a generally rectangular cuboid shape. The parabolic transmission mirror 400 includes an optical inlet 402 at a first end 404, and an optical outlet 406 at a second end 408 opposite the first end 404. In the example shown, each of the optical inlet 402 and the optical outlet 406 have a circular cross-section. The parabolic transmission mirror 400 also includes a parabolic reflective surface 410 about an interior volume 412 between the first end 404 and the second end 408. The parabolic reflective surface 410 defines a focal point 414 outside the internal volume 412, and beyond the optical outlet 406 at the second end 408. In some implementations, where the optical inlet of the parabolic reflective mirror has a diameter of between 150-200 millimeters (mm), the parabolic reflective surface 410 defines a focal point at a location between zero (0) and five (5) millimeters (mm) beyond the second end 408. In the example shown, the parabolic reflective surface 410 forms a paraboloid-shaped surface, and extends from the optical inlet 402 to the optical outlet 406. In some implementations, the ratio of the surface area of the parabolic reflective surface 410 to the area of the optical inlet 402 is greater than 2.5. For example, where the parabolic transmission mirror 400 has an optical inlet with a diameter of 160 millimeters (mm) and a focal length of 10 millimeters (mm), the ratio may be approximately 2.8. In some implementations, the parabolic transmission mirror 400 may be formed with a larger diameter optical outlet (still less than the diameter of the optical inlet) and shorter overall length, for example, to stretch the focal point into an annular or needle-like shape (as compared with a point-like shape). The parabolic transmission mirror 400 may be formed in another manner.

Figure 5:
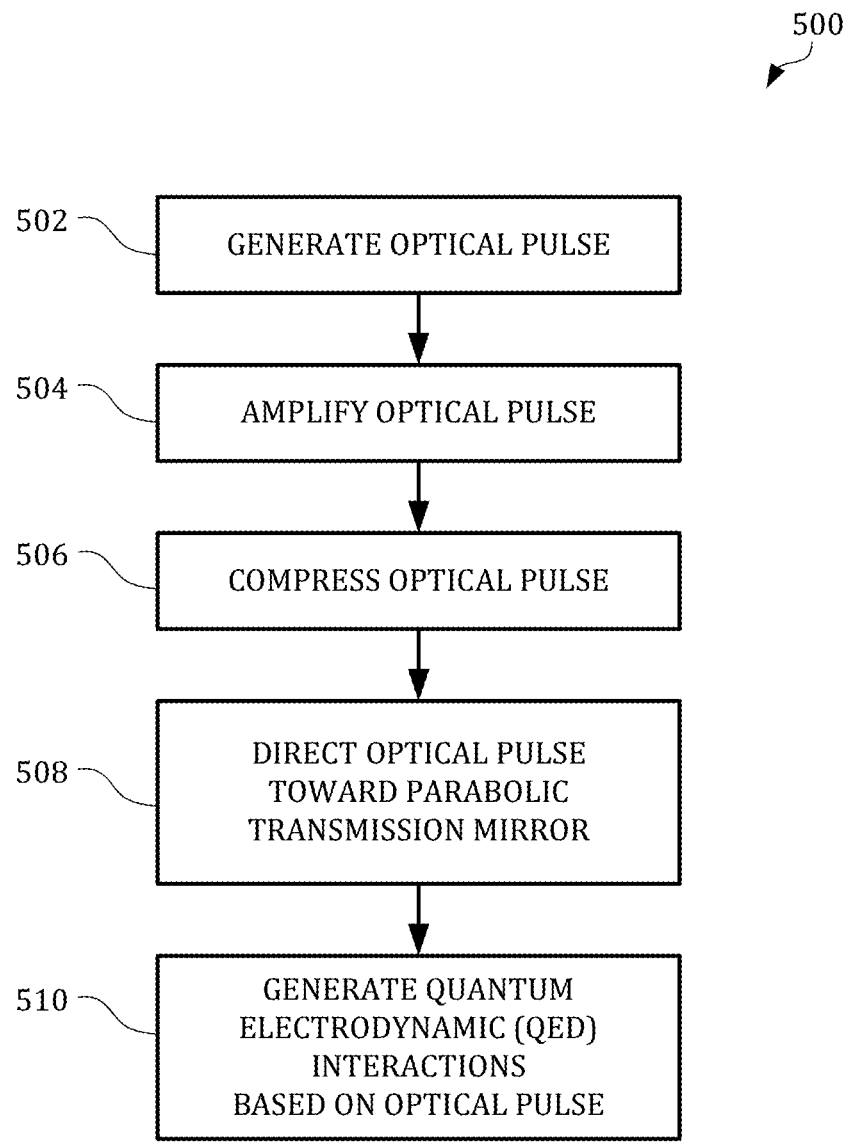
FIG. 5 is a flow diagram showing an example process for generating quantum electrodynamic (QED) interactions using a parabolic transmission mirror.

FIG. 5 is a flow diagram showing an example process for generating quantum electrodynamic (QED) interactions using a parabolic transmission mirror. The process 500 may be implemented using the system 100 of FIG. 1, the system 200 of FIG. 2, or another system for generating QED interactions. In some implementations, one or more operations of the process 500 are performed by optical elements or other components operating under vacuum pressure. For example, the parabolic transmission mirror may reside in a vacuum chamber that operates at ultra-high vacuum pressures (e.g., below $10^{-8}$ Torr, below $10^{-10}$ Torr, or below $10^{-11}$ Torr).

At 502, an optical pulse is generated by an optical pulse generator. Referring to the example system 100 of FIG. 1 for instance, the pulse generator 102 may generate an optical pulse. The optical pulse generator may include, in some instances, a femtosecond laser oscillator (e.g., a Ti:sapphire oscillator). The optical pulse generator may also include, in some instances, a chirped pulse amplifier (CPA) in addition to a femtosecond laser oscillator. The optical pulse may be an ultrashort, transform-limited pulse. For example, in some implementations, the optical pulse can have a duration of approximately 25 femtoseconds (fs) and spectrum of approximately 750-850 nanometers (nm), a duration of approximately 15 femtoseconds (fs) and spectrum of approximately 730-870 nanometers (nm), or a duration of approximately 10 femtoseconds (fs) and spectrum of approximately 650-950 nanometers (nm).

At 504, the optical pulse is amplified by a pulse amplifier. The pulse amplifier may be arranged to directly or indirectly receive the optical pulse generated by the pulse generator at 502. Referring again to the example system 100 of FIG. 1 for instance, the pulse amplifier 104 directly receives the optical pulse generated by the pulse generator 102. The pulse amplifier may include one or more gain media that operate to increase the energy of the optical pulse as it travels therethrough. In some implementations, the pulse amplifier includes a multipass amplifier with a Ti:sapphire gain medium.

At 506, the optical pulse is compressed by a pulse compressor. The pulse compressor may be arranged to directly or indirectly receive the optical pulse amplified by the pulse amplifier at 504. Referring again to the example system 100 of FIG. 1 for instance, the pulse compressor 110 indirectly receives (through the optical inlet 106) the optical pulse amplified by the pulse amplifier 104. The pulse compressor may include one or more optical elements defining an optical path through the pulse compressor, with the optical elements being arranged within the pulse compressor to disperse the optical pulse in the optical path. For example, the pulse compressor may disperse the optical pulse using one or more dispersive optical elements (e.g., diffraction gratings or dispersive mirrors).

At 508, the optical pulse is directed toward a parabolic transmission mirror. The optical pulse may be directed toward the parabolic transmission mirror by one or more optical elements. In some implementations, the optical elements include one or more deformable mirrors arranged to reflect an optical pulse received from a pulse compressor. Referring again to the example system 100 of FIG. 1 for instance, the deformable mirror 112 reflects the compressed optical received from the pulse compressor 110 and directs it toward the parabolic transmission mirror 114. In some implementations, the optical pulse is directed toward a cascaded system of parabolic transmission mirrors. For example, a deformable mirror (e.g., the deformable mirror 112 of FIG. 1) may direct a compressed optical pulse toward a cascaded system of parabolic transmission mirrors (e.g., the system 300A of FIG. 3A). In some implementations, the cascaded system of parabolic transmission mirrors may include a deformable mirror between respective pairs of parabolic transmission mirrors. For example, the cascaded system may be implemented similar to the system 300B of FIG. 3B.

At 510, QED interactions are generated based on the optical pulse. The QED interactions may include four wave nonlinear optical mixing processes, or other types of QED interactions (e.g., Compton scattering processes, trident processes, Breit-Wheeler processes, or Schwinger pair production processes). The QED interactions may be generated by focusing the optical pulse toward the focal point of the parabolic transmission mirror to create a high intensity region in which the QED interactions can occur. In some instances, a thin film is placed at the focal point of the parabolic transmission mirror to enhance QED interaction generation. A thin film at the focal point of the parabolic transmission mirror may allow for the study of QED interactions taking place within the system, or may enhance QED interactions. Referring to the example system 100 of FIG. 1 for instance, the thin film 118 at the focal point 116 may enhance QED interactions generated by the system 100. In some instances, a particle beam is directed toward the focal point of the parabolic transmission mirror to enhance QED interaction generation. Referring to the example system 200 of FIG. 2 instance, the beam generator 218 directs a particle or photon beam 220 toward the focal point 216 to enhance the production of QED interactions.

In some implementations, the QED interactions are detected using a probe near the focal point of the parabolic transmission mirror. Referring again to the system 100 of FIG. 1, the system 100 (using the probe 122) may detect the generation of particles 120A and 120B. In some implementations, products of the QED interactions are collected using a collector near the focal point of the parabolic transmission mirror. Referring again to the system 100 of FIG. 1, the collector 124 that collects the particles 120A and 120B.

In a general aspect of the examples described here, quantum electrodynamic (QED) interactions are generated using a parabolic transmission mirror.

In a first example, a system for generating a QED interaction includes an optical pulse generator and a vacuum chamber. The vacuum chamber includes a parabolic transmission mirror in an ultra-high vacuum region within the vacuum chamber. The parabolic transmission mirror is configured to produce the QED interaction in the ultra-high vacuum region based on an optical pulse from the optical pulse generator. The parabolic transmission mirror includes an optical inlet at a first end and an optical outlet at a second, opposite end. The parabolic transmission mirror also includes a parabolic reflective surface about an internal volume of the parabolic transmission mirror between the first and second ends. The parabolic reflective surface extends from the optical inlet to the optical outlet and defines a focal point outside the internal volume of the parabolic transmission mirror.

Implementations of the first example may include one or more of the following features. The QED interaction may include a four-wave nonlinear optical mixing process (FWM) a Compton scattering process, a trident process, a Breit-Wheeler process, or a Schwinger pair production process. The system may include a thin film at the focal point. The system may include a beam generator arranged to direct a particle beam or photon beam toward the focal point. The parabolic reflective surface may define the focal point at a distance beyond the second end of the parabolic transmission mirror that is less than the focal length of the parabolic transmission mirror. The system may further include a pulse amplifier configured to receive the optical pulse from the optical pulse generator, produce an amplified optical pulse by amplifying the optical pulse from the pulse generator, and provide the amplified optical pulse to an optical inlet of the vacuum chamber. The vacuum chamber may include a pulse compressor configured to receive the amplified optical pulse from the optical inlet of the chamber, and generate a compressed optical pulse by compressing the amplified optical pulse. The vacuum chamber may include a deformable mirror that defines at least a portion of an optical path of the compressed optical pulse between the pulse compressor and the parabolic transmission mirror. The deformable mirror may include actuators that cause a reflective surface of the deformable mirror to deform as pressure is applied to the reflective surface by the actuators. The optical pulse generator may include a femtosecond laser oscillator, the pulse amplifier may include a chirped pulse amplification system, and the pulse compressor may include optical elements defining an optical path through the pulse compressor with the optical elements arranged to disperse the optical pulse in the optical path. The optical inlet may be a first circular opening having a first diameter, and the optical outlet may be second circular opening having a second, smaller diameter. A ratio of the surface area of the parabolic reflective surface to the area of the optical inlet is greater than 2.5. The system may also include a probe within the vacuum chamber and adapted to detect QED interactions. The system may also include a collector within the vacuum chamber and adapted to collect matter and anti-matter generated by the QED interaction.

Implementations of the first example may include one or more of the following features. The parabolic transmission mirror may be a first parabolic transmission mirror and the focal point may be a first focal point, and the system may include a second parabolic transmission mirror. The second parabolic transmission mirror may include an optical inlet at a first end of the second parabolic transmission mirror, an optical outlet at a second, opposite end of the second parabolic transmission mirror, and a parabolic reflective surface about an internal volume of the second parabolic transmission mirror between the first and second ends. The parabolic reflective surface of the second parabolic reflective mirror may extend from the optical inlet to the optical outlet and may define a second focal point outside the internal volume of the second parabolic transmission mirror. The first and second parabolic transmission mirrors may be arranged such that the first focal point coincides with the second focal point. The system may include a cascading arrangement of multiple pairs of parabolic transmission mirrors, with the parabolic transmission mirrors of each pair arranged such that their focal points coincide. The system may include a deformable mirror that defines an optical path between a first and second pair of parabolic transmission mirrors.

In a second example, a method includes transmitting an optical pulse toward a parabolic transmission mirror in an ultra-high vacuum region in a vacuum chamber and producing a QED interaction at the focal point of the parabolic transmission mirror based on the optical pulse. The parabolic transmission mirror includes an optical inlet at a first end of the parabolic transmission mirror, an optical outlet at a second, opposite end of the parabolic transmission mirror, and a parabolic reflective surface about an internal volume of the parabolic transmission mirror between the first and second ends. The parabolic reflective surface extends from the optical inlet to the optical outlet and defines a focal point outside the internal volume of the parabolic transmission mirror.

Implementations of the second example may include one or more of the following features. Producing the QED interaction may include producing a four-wave nonlinear optical mixing process (FWM), a Compton scattering process, a trident process, a Breit-Wheeler process, or a Schwinger pair production process. The method may include directing a particle beam toward the focal point of the parabolic transmission mirror. The QED interaction may be produced by the optical pulse and the particle beam. Producing the QED interaction may include generating positronium from a thin film at the focal point. Transmitting the optical pulse toward the parabolic transmission mirror may include transmitting the optical pulse toward a cascaded arrangement of parabolic transmission mirrors. The method may include detecting QED interactions using a probe near the focal point. The method may include collecting products of the QED interaction using a collector near the focal point.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A system for generating a quantum electrodynamic (QED) interaction, the system comprising:
an optical pulse generator; and
a vacuum chamber comprising a parabolic transmission mirror in an ultra-high vacuum region within the vacuum chamber, the parabolic transmission mirror configured to produce the QED interaction in the ultra-high vacuum region based on an optical pulse from the optical pulse generator, the parabolic transmission mirror comprising:
an optical inlet at a first end of the parabolic transmission mirror;
an optical outlet at a second, opposite end of the parabolic transmission mirror; and
a parabolic reflective surface about an internal volume of the parabolic transmission mirror between the first and second ends, wherein the parabolic reflective surface extends from the optical inlet to the optical outlet and defines a focal point outside the internal volume of the parabolic transmission mirror.

2. The system of claim 1, wherein the QED interaction comprises a four-wave nonlinear optical mixing process (FWM), a Compton scattering process, a trident process, a Breit-Wheeler process, or a Schwinger pair production process.

3. The system of claim 1, comprising a thin film at the focal point.

4. The system of claim 1, comprising a beam generator arranged to direct a particle beam or photon beam toward the focal point.

5. The system of claim 1, wherein the parabolic reflective surface defines the focal point at a distance beyond the second end of the parabolic transmission mirror that is less than the focal length of the parabolic transmission mirror.

6. The system of claim 1, further comprising a pulse amplifier configured to:
receive the optical pulse from the optical pulse generator;
produce an amplified optical pulse by amplifying the optical pulse from the pulse generator; and
provide the amplified optical pulse to an optical inlet of the vacuum chamber.

7. The system of claim 6, wherein the vacuum chamber comprises a pulse compressor configured to:
receive the amplified optical pulse from the optical inlet of the chamber; and
generate a compressed optical pulse by compressing the amplified optical pulse.

8. The system of claim 7, wherein the vacuum chamber comprises a deformable mirror that defines at least a portion of an optical path of the compressed optical pulse between the pulse compressor and the parabolic transmission mirror.

9. The system of claim 8, wherein the deformable mirror comprises actuators that cause a reflective surface of the deformable mirror to deform as pressure is applied to the reflective surface by the actuators.

10. The system of claim 7, wherein the optical pulse generator comprises a femtosecond laser oscillator, the pulse amplifier comprises a chirped pulse amplification system, and the pulse compressor comprises optical elements defining an optical path through the pulse compressor, the optical elements arranged to disperse the optical pulse in the optical path.

11. The system of claim 1, wherein the optical inlet is a first circular opening having a first diameter, and the optical outlet is second circular opening having a second, smaller diameter.

12. The system of claim 1, wherein a ratio of the surface area of the parabolic reflective surface to the area of the optical inlet is greater than 2.5.

13. The system of claim 1, comprising a probe within the vacuum chamber and adapted to detect the QED interaction.

14. The system of claim 1, comprising a collector within the vacuum chamber and adapted to collect matter and anti-matter generated by the QED interaction.

15. The system of claim 1, wherein the parabolic transmission mirror is a first parabolic transmission mirror and the focal point is a first focal point, and the system comprises a second parabolic transmission mirror comprising:
- an optical inlet at a first end of the second parabolic transmission mirror;
- an optical outlet at a second, opposite end of the second parabolic transmission mirror; and
- a parabolic reflective surface about an internal volume of the second parabolic transmission mirror between the first and second ends, wherein the parabolic reflective surface extends from the optical inlet to the optical outlet and defines a second focal point outside the internal volume of the second parabolic transmission mirror;
- wherein the first and second parabolic transmission mirrors are arranged such that the first focal point coincides with the second focal point.

16. The system of claim 1, comprising a cascading arrangement of multiple pairs of parabolic transmission mirrors, wherein the parabolic transmission mirrors of each pair are arranged such that their focal points coincide.

17. The system of claim 16, comprising a deformable mirror that defines an optical path between a first and second pair of parabolic transmission mirrors.

18. A method of generating a quantum electrodynamic (QED) interaction, comprising:
- transmitting an optical pulse toward a parabolic transmission mirror in an ultra-high vacuum region in a vacuum chamber, the parabolic transmission mirror comprising:
  - an optical inlet at a first end of the parabolic transmission mirror;
  - an optical outlet at a second, opposite end of the parabolic transmission mirror; and
  - a parabolic reflective surface about an internal volume of the parabolic transmission mirror between the first and second ends, wherein the parabolic reflective surface extends from the optical inlet to the optical outlet and defines a focal point outside the internal volume of the parabolic transmission mirror; and
- producing the QED interaction at the focal point of the parabolic transmission mirror based on the optical pulse.

19. The method of claim 18, wherein producing the QED interaction comprises producing a four-wave nonlinear optical mixing process (FWM), a Compton scattering process, a trident process, a Breit-Wheeler process, or a Schwinger pair production process.

20. The method of claim 18, comprising directing a particle beam toward the focal point of the parabolic transmission mirror, wherein the QED interaction is produced by the optical pulse and the particle beam.

21. The method of claim 18, wherein producing the QED interaction comprises generating positronium from a thin film at the focal point.

22. The method of claim 18, wherein transmitting the optical pulse toward the parabolic transmission mirror comprises transmitting the optical pulse toward a cascaded arrangement of parabolic transmission mirrors.

23. The method of claim 18, comprising detecting the QED interaction using a probe near the focal point.

24. The method of claim 18, comprising collecting products of the QED interaction using a collector near the focal point.

* * * * *